No. 610,087. Patented Aug. 30, 1898.
A. J. SAVAGE.
SALT AND PEPPER BOX.
(Application filed Sept. 14, 1897.)
(No Model.)
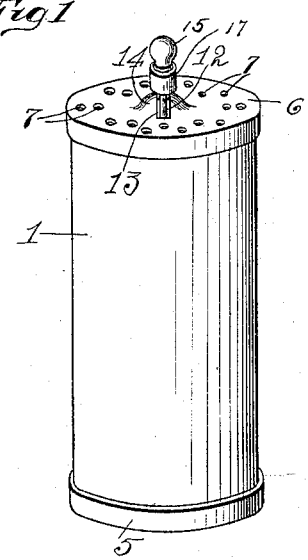
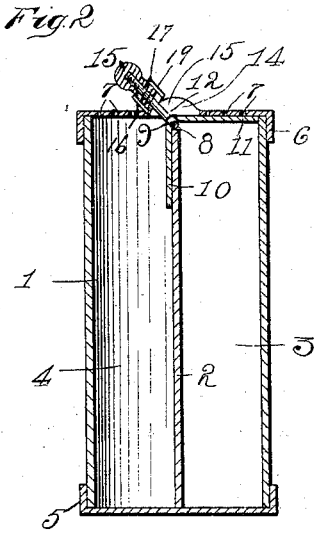
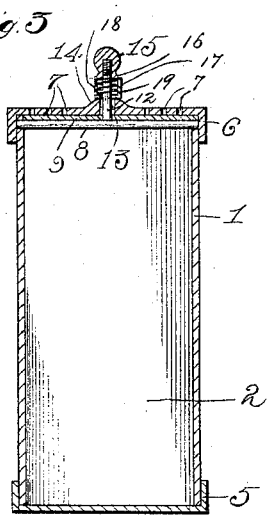
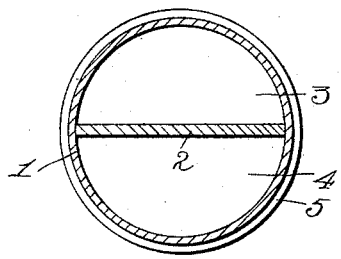
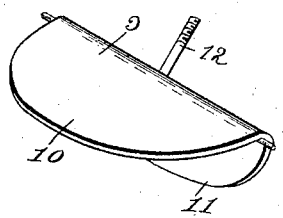
Witnesses
Inventor
Alexander J Savage
by John Wedderburn
Attorney

UNITED STATES PATENT OFFICE.

ALEXANDER J. SAVAGE, OF NORFOLK, VIRGINIA, ASSIGNOR OF ONE-FOURTH TO A. J. BOLSOM, OF SAME PLACE.

SALT AND PEPPER BOX.

SPECIFICATION forming part of Letters Patent No. 610,087, dated August 30, 1898.

Application filed September 14, 1897. Serial No. 651,661. (No model.)

*To all whom it may concern:*

Be it known that I, ALEXANDER J. SAVAGE, a citizen of the United States of America, residing at Norfolk, in the county of Norfolk and State of Virginia, have invented certain new and useful Improvements in Salt and Pepper Boxes; and I do hereby declare the following to be a full, clear, and exact description of the invention, such as will enable others skilled in the art to which it appertains to make and use the same.

The object of my invention is to provide a combined salt and pepper box, from which either or both of the substances with which the box is filled may be shaken.

The invention consists of a casing divided up into a plurality of compartments by a partition, a perforated top on said casing, and a pivotally-mounted cut-off comprising two wings lying at right angles to each other and adapted to be operated from the outside for closing one of said compartments and at the same time opening the other.

The invention also consists in providing the perforated top with a raised portion or bulge and the pivoted cut-off with a stem projecting through the cover, said stem having a handle secured upon its upper end, a cup in which the lower end of the handle fits, and a spring within said cup, whereby when the handle is moved the spring will press the cup against the raised portion and hold the cut-off in any desired position.

The invention also consists in other details of construction and combinations of parts, which will be hereinafter more fully described and claimed.

In the drawings forming a part of this specification, Figure 1 represents a perspective view of my improved device. Fig. 2 is a vertical sectional view through the same. Fig. 3 is a similar view at right angles to Fig. 2. Fig. 4 is a cross-section, and Fig. 5 is a detail perspective view of the cut-off.

Like reference-numerals indicate like parts in the different views.

My improved salt and pepper receptacle is made up of a casing 1, preferably cylindrical in form, provided with a central longitudinal partition 2, dividing the same into compartments 3 and 4 for the reception of salt and pepper, respectively. The lower end of the casing 1 may be closed by a removable cover 5, and the upper end thereof is closed by a removable cap 6, provided with perforations 7 7 therein.

Secured to the sides of the casing 1, at a point adjacent to the upper end of the partition 2, is a rod or shaft 8, to which is connected a cut-off 9, the said cut-off being made of a disk of sheet metal bent through its central point, forming two wings or leaves 10 and 11, which are substantially semicircular in form and lie at right angles one to the other.

Extending upwardly from the cut-off 9 is a stem 12, which projects through an elongated slot 13 in the lid or cover 6. The said lid or cover adjacent to the sides of the slot 13 bulges upwardly or outwardly, as shown at 14. To the upper end of the stem 12 is screwed or otherwise secured a knob or handle 15, whose shank 16 fits loosely within the upper end of a cup 17, having an opening 18 in the bottom thereof, through which the stem 12 passes, and containing a coil-spring 19, which surrounds said stem. The lower end of said cup is normally held downwardly in contact with the bulged portion 14 of the cap 6 by means of the spring 19, so that to whatever position the cut-off 9 may be turned it will be held in adjusted position by the frictional contact between said cup and the cover 6.

In using my device the compartments 3 and 4 are filled with salt and pepper, respectively, and the perforated cover 6 placed upon the upper end of the casing 1. The cut-off 9 is then swung upon its pivot in one direction or the other, according to the substance it is desired to use, this action closing one of the compartments 3 or 4 and opening the other. The substance contained in the compartment which is opened is free to be shaken out of the receptacle through the perforations in the cover 6. If it be desired to use the other substance, the cut-off 9 is moved in the opposite direction. If it be desired to use both salt and pepper at the same time, the cut-off may be moved so that the stem 12 projects through the slot 13 at its central point. Upon inverting the receptacle when the parts are in this position and agitating the same both of the substances with which it is filled will be discharged through the perforations 7 in the cover 6. The said cut-off 9, as heretofore stated, will be held in adjusted position to permit of the removal of both of the substances by the frictional engagement between the lower end of the cup 17 and the bulged or raised portion 14 of the cover 6.

While I have described the cut-off as being pivoted to the upper end of the cylindrical casing 1, it is obvious that it may, if desired, be pivoted to the lid or cover 6. The covers 5 and 6 have both been described as removable; but it is obvious that one of them may be dispensed with altogether, its place being taken in the case of the cover 5 by an imperforate disk secured to the lower end of the casing 1 and in the case of the cover 6 by a perforated disk secured to the upper end of the casing 1. When both covers are made removable, as shown and described, the compartments 3 and 4 may be filled from either the upper or lower end.

The perforations 7 in the cover 6 are preferably made larger on one side of the slot or opening 13 than on the other, the larger opening being located opposite the compartment containing the salt and the smaller opposite to the compartment containing the pepper.

Having now described the invention, what I claim as new, and desire to secure by Letters Patent, is—

1. A receptacle for salt and pepper having a longitudinal partition therein dividing the same up into a plurality of compartments, a pivotally-mounted cut-off comprising two wings lying at substantially right angles one to the other, each adapted to close the compartment in which it is located, and means for operating said cut-off from the outside of the receptacle.

2. A receptacle for salt and pepper having a longitudinal partition therein dividing the same up into a plurality of compartments, a pivotally-mounted cut-off comprising two wings lying at substantially right angles one to the other, each adapted to close the compartment in which it is located, means for operating said cut-off from the outside of said receptacle, and means for holding it to any position to which it may be adjusted.

3. A receptacle for salt and pepper having a longitudinal partition therein dividing the same up into a plurality of compartments, a pivotally-mounted cut-off adapted to close one of said compartments and simultaneously open the other, a perforated upper end on said receptacle having an elongated slot therein, a stem on said cut-off extending through said slot, a handle on said stem whereby said cut-off may be turned, and a frictional connection between said handle and the perforated upper end of said receptacle.

4. A receptacle for salt and pepper made up of a cylindrical casing having a longitudinal partition therein dividing the same up into a plurality of compartments, a perforated cover upon the upper end of said casing having an elongated slot therein with a raised portion or bulge adjacent to said slot, a cut-off pivotally mounted in said casing adjacent to the upper end of said partition made up of a disk bent at its central point forming two substantially semicircular wings adapted to close the upper ends of said compartments respectively, a stem on said cut-off projecting through a slot in said perforated cover, a handle secured upon the upper end of said stem, a cup in which the lower end of said handle fits and through which said stem passes, and a spring located within said cup for holding the same down in contact with the raised portion or bulge on said perforated cover, as and for the purpose set forth.

In testimony whereof I have signed this specification in the presence of two subscribing witnesses.

ALEXANDER J. SAVAGE.

Witnesses:
WILLIAM G. PEGRAM,
HANS MILLER.